United States Patent [19]

Meston

[11] 4,406,097
[45] Sep. 27, 1983

[54] TELESCOPIC MECHANISM

[75] Inventor: Spencer D. Meston, Bristol, England

[73] Assignee: British Aerospace Public Limited Company, London, England

[21] Appl. No.: 237,946

[22] Filed: Feb. 25, 1981

[30] Foreign Application Priority Data

Feb. 28, 1980 [GB] United Kingdom ............... 8006751

[51] Int. Cl.³ .............................................. B66C 23/04
[52] U.S. Cl. ..................................... 52/118; 52/115;
182/40; 182/195
[58] Field of Search .................. 52/111, 115, 118, 117;
182/40, 41, 195, 209, 210, 211; 248/354 P, 408, 409

[56] References Cited

U.S. PATENT DOCUMENTS 2,858,154 10/1958 Johansson .................... 182/195 UX
4,254,423 3/1981 Reinhard ......................... 52/118 X

FOREIGN PATENT DOCUMENTS 268875 1/1914 Fed. Rep. of Germany ........ 52/115
2405711 8/1974 Fed. Rep. of Germany ........ 52/118

OTHER PUBLICATIONS

Proc. European Symp. on Photovoltaic Generators in Space, "The ESA Lightweight Hybrid Solar Array", P. A. Champion et al., Sep. 11-13, 1978, -ESA SP.-140 Nov. 1978, pp. 247-253.

Primary Examiner—John E. Murtagh
Assistant Examiner—Richard E. Chilcot, Jr.
Attorney, Agent, or Firm—Cushman, Darby & Cushman

[57] ABSTRACT

A telescopic boom arrangement comprises an innermost member, a plurality of intermediate tubular sections 12, and an outermost tubular member, each nested together, the arrangement being adapted so that sequential erection of the members from a stowed position is ensured, commencing with the innermost member, progressing with the next outer member and so on. Each intermediate member includes latching means 24 which serve both to lock the next inner member in a stowed position and to lock that member in an extended position. Unlatching of the latch means 24 of an intermediate member to allow extension of the next inner member is effected by fingers 23 on the next-but-one inner member when that member approaches its extended position. When the next inner member reaches its extended position, it is locked by means of latching means 24 engaging slot 25.

7 Claims, 9 Drawing Figures

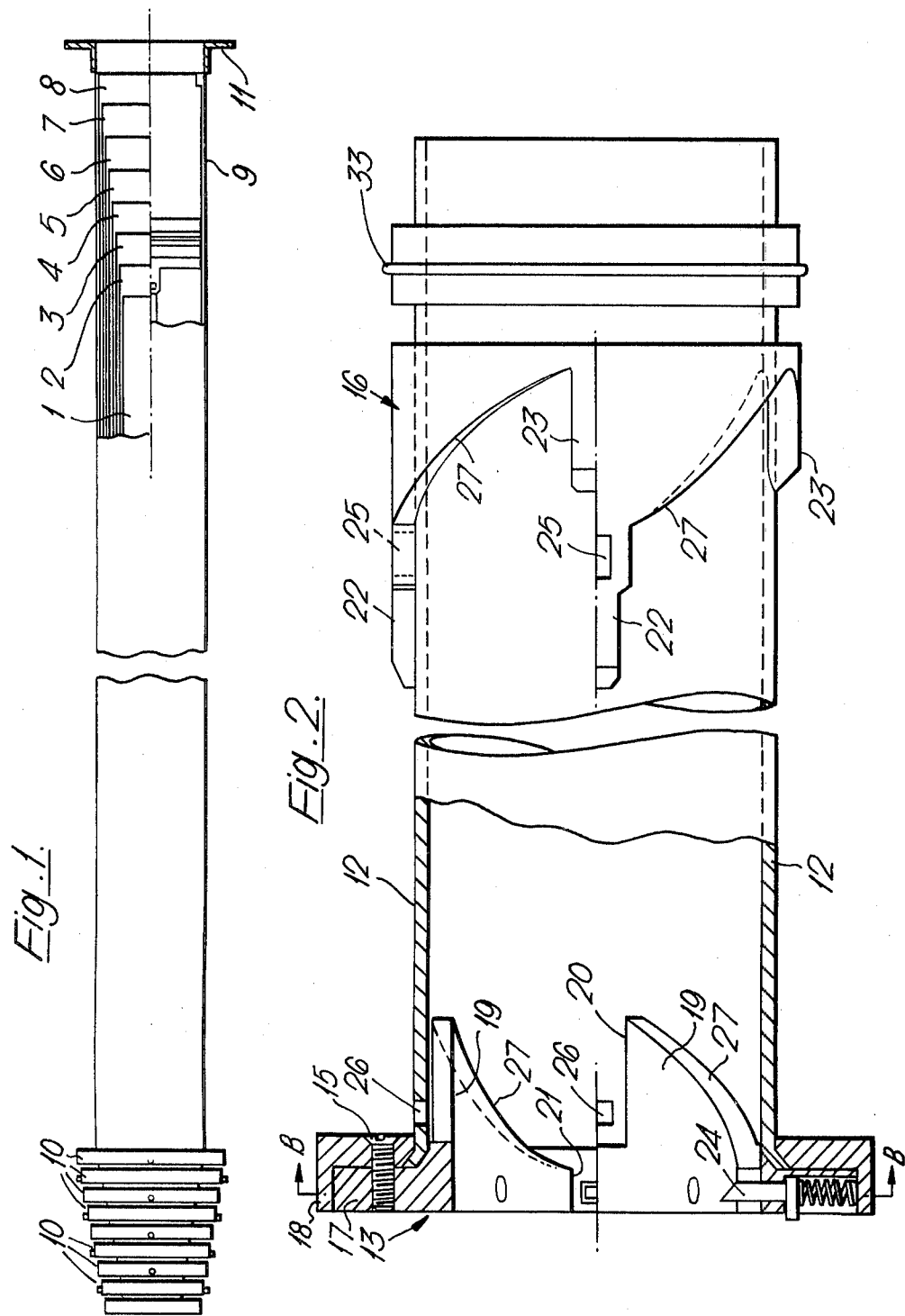

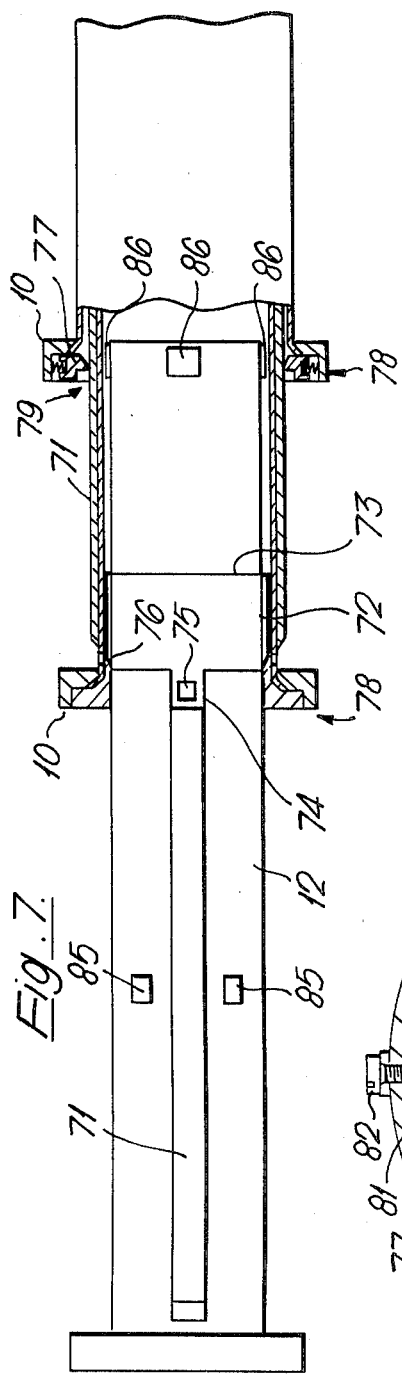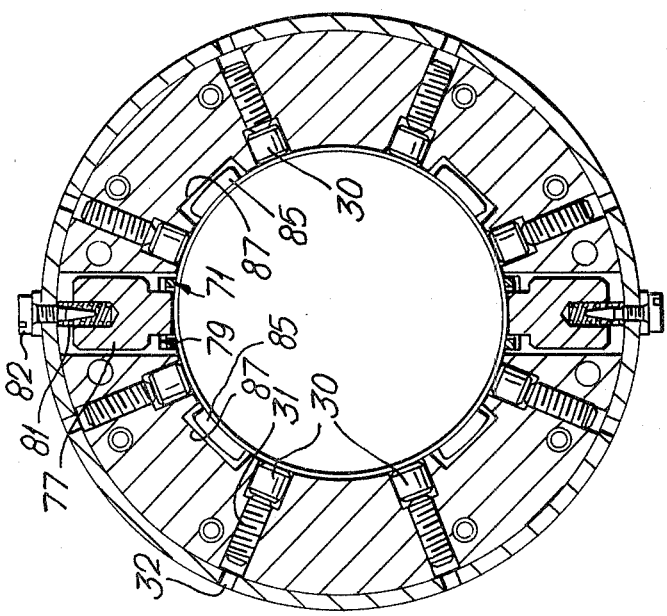

TELESCOPIC MECHANISM

This invention relates to a telescopic variable-length device comprising a plurality of tubular sections nested one within another. By way of example, the device may be a carrier boom for deploying apparatus such as a solar cell array in a spacecraft and it may be extended by admitting compressed gas to the tubular sections.

It may be desirable to ensure that, while the device is being extended, the sections thereof move outwards in a controlled sequence. To achieve this, it has been proposed to provide the device with a series of sprung latches which hold the respective sections fixed with respect to the next adjacent sections. The latches are carefully adjusted so that each is overcome by a different value of force—thus the weakest latch is arranged to act on the tubular section which is to move first in the deployment sequence, the next stronger latch acts upon the section which is to move second and so on.

It will be appreciated that this arrangement does not positively ensure the correct deployment sequence and furthermore requires very careful adjustment of the latches.

According to one aspect of this invention, there is provided a multi-member telescopic boom arrangement of members nested one within another and adapted for ensuring sequential erection of the members from a stowed condition commencing with the innermost element and progressing outwardly, which arrangement includes an outermost member for anchorage to a base, an innermost member forming the remote end of the extending and extended boom, one or more intermediate members lying, when stowed, between the innermost and outermost members, means for locking the or each intermediate member to the next outer member in the stowed condition, means for unlocking the locking means between two adjacent members when the next inner member to the two has reached a desired position with respect to the inner member of the two, there being location means to maintain the relative positions of each two adjacent members when the inner member of the two reaches the desired position, whereby on displacement of an inner member to its desired position, the locking means between the next two outer members is released, thereby allowing said inner member, together with its adjacent outer member to move outwardly with respect to the remaining outer members until the adjacent outer member reaches its desired position, whereupon the locking means is released between a further adjacent two successive outer members.

Preferably, the locking means comprise latch means provided in the outer member and the or each intermediate member, each latch means being urged inwardly to co-operate with slot means formed in the inner adjacent intermediate member to latch adjacent members in the stowed condition.

The unlocking means may advantageously comprise cam means provided on the innermost member and each intermediate member—excepting that intermediate member immediately adjacent the outermost member—each of said cam means being co-operable with the latch means on the next but one outer member to enable release of the latch means from the slot means in the next outer intermediate member.

Where the locking means comprise latch means, the location means for each two adjacent members can advantageously include an aperture provided in the inner member of the two which is engaged by the latch means of the outer member of the two when the inner member reaches its desired position with respect to the outer member. In this case, it will be understood that each intermediate member may be latched either in an extended or stowed position.

Means are preferably provided to prevent rotation between adjacent members.

The inner member of each two adjacent members preferably includes bearing means adapted to bear on the inside surface of the outer member of the two. Similarly, the outer member of two adjacent members may include bearing means adapted to bear on the outside surface of the inner member.

The latch means (where provided) on successive intermediate members are preferably spaced by approximately 90° about the longitudinal axis of the member.

According to another aspect of this invention, there is provided an element for use as an intermediate member in a boom arrangement according to this invention, which element comprises a generally circular tubular member having a rearward end portion and a forward end portion, the outer part of the rearward end portion including cam means, and rebate means spaced forwardly of the cam means and spaced at approximately 90° about the longitudinal axis of the tubular member thereto, the inner part of the forward end portion including latch means urged inwardly and an aperture spaced rearwardly thereof and at approximately 90° around the longitudinal axis thereto, said aperture being longitudinally aligned with the rebate means.

The rebate means preferably is defined in a forwardly directed finger, said finger including cam means spaced forwardly of the rebate means, and the forward end fitting preferably includes channel means located adjacent the latch means, said channel means being adapted to receive the finger means of an adjacent inner element of substantially similar configuration.

For a better understanding of the invention and to show how the same may be carried into effect, reference will now be made, by way of example, to the accompanying drawings in which:

FIG. 1 is a partly sectioned elevation of a telescopic boom;

FIG. 2 is a composite partly sectioned diagrammatic view of one intermediate section of the boom of FIG. 1, the view being taken in the directions shown by lines AA' and CC' in FIG. 3, the upper half of FIG. 2 being a partly sectioned side view of arrows AA', and the lower half being a partly sectioned side view on arrows CC'.

FIG. 3 is a section on line BB in FIG. 2;

FIG. 7 is a diagrammatic view of a second embodiment of boom of this invention; k FIG. 9 is a sectional end view of a part of the boom shown in FIG. 7.

As shown in FIG. 1, the boom comprises a plurality of tubular sections 1 to 9 nested one within another. At one end of the boom, the left-hand end in FIG. 1, each tubular section bears a flange 10. At the other end of the boom, the outermost tubular section 9 has a flange 11 by which the boom may be affixed to a mounting point on a spacecraft (not shown). The boom is extended by admitting gas under pressure to the interior of the tubular sections so as to push each tubular section out from within the next outer tubular section. The speed of the extension may be controlled by the means described lin our co-pending patent application No. 8031264. The boom also comprises latching means for ensuring that the tubular sections move to their extended positions in a desired sequence rather than randomly. In the present case, the innermost tubular section is to move first, then the next larger section, then the next and so on.

Figure 3:
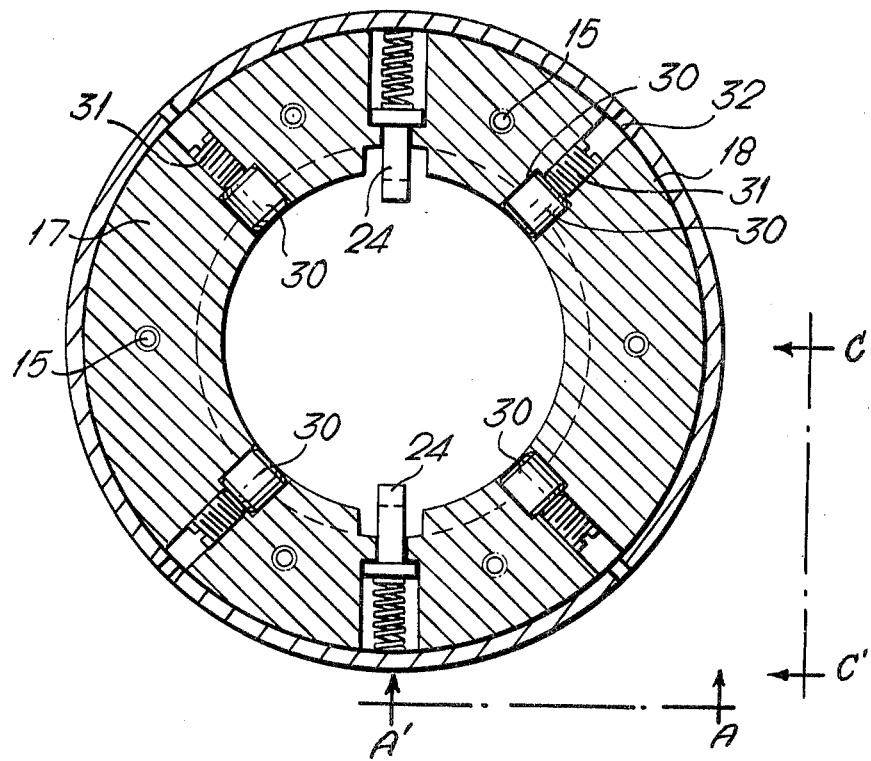
FIG. 3 is a transverse section view of one intermediate section of the boom of FIG. 1, taken on lines BB of FIG. 1.
Figure 5:
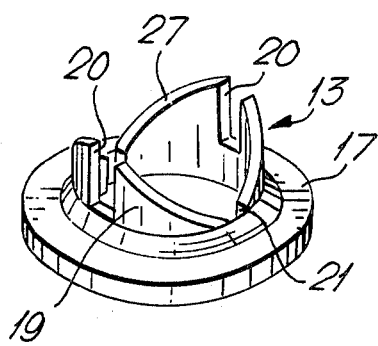
FIGS. 4 and 5 are respective perspective diagrams of a rear end fitting and a forward end fitting forming part of each tubular section of the boom.
Figure 4:
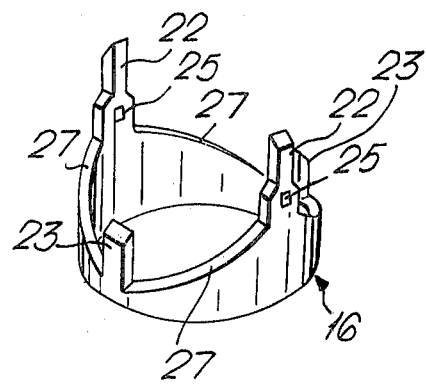

As shown in FIGS. 2 to 5, each of the tubular sections 2 to 8 comprises a light metal tube 12 which is flared at its forward end ("forward" here referring to the direction in which the tube moves when it is extended) and to which are attached a forward end fitting 13 and a rear end fitting 16 respectively shown in FIGS. 4 and 5. The forward end fitting 13 comprises two co-operating flanged parts 17 and 18 which together form the flange 10 and which are clamped together by screws 15 with the flared forward end of the tube 12 between them. Shaped, half-sleeve members 19 extend from the part 17 into the tube 12 and define therein pairs of slots 20 and 21 for receiving latching fingers 22 and 23 respectively defined by the rear-end fitting 16 of the tubular section which fits inside the one shown. The rear end fitting 16 comprises a sleeve which fits around the outside of the tube 12 and of which one end is shaped to form the aforementioned latching fingers, there being four of these two longer ones 22 and two shorter 23. When the tube reaches its extended position, the shorter fingers 23 engage within the slots 20 of the forward end fitting of the next larger tube while the fingers 22 enter the slots 21 of that fitting. The flanged part 17 has mounted therein two spring-loaded latch members 24 which extend through the slots 21. The fingers 22 have apertures 25 therein for receiving the latch members 24. Similar apertures 26 are formed in the tube 12 in alignment with the neighbouring slots 20.

The innermost tubular section 1 of the boom has the rear-end fitting 16 shown in FIG. 2 but not the forward-end fitting 13 while the outermost tubular section 9 has the forward-end fitting but not the rear one. Each tube is oriented at 90° with respect to its neighbours, i.e. so that the fingers 22 and 23 of a tube coincide with the respective slots 21 and 20 of the next outer tube. Between the slots of the fitting 13 and the fingers of the fitting 16, each fitting is shaped to present inclined surfaces 27 to one another so that if the fingers and slots are initially slightly out of coincidence, the tubes will in any case be brought to the correct relative orientations as each reaches its extended position.

The flange part 17 is provided with radially extending holes which contain respective low-friction bearing members 30 for supporting and centering the next smaller tubular section. The engagement force between the members 30 and this next smaller tubular section can be adjusted by means of set-screws 31 to which access is gained by way of aligned holes 32 formed in the ring-shaped flange part 18. To avoid confusing the drawing, only four bearing members 30 are shown but, as will be appreciated, there can be a number other than four. In a practical embodiment, there might be eight such bearing members. An O-ring seal 33 may be mounted around the rear-end fitting 16 to provide a gas-tight seal between each section and the next one.

Figure 6A:
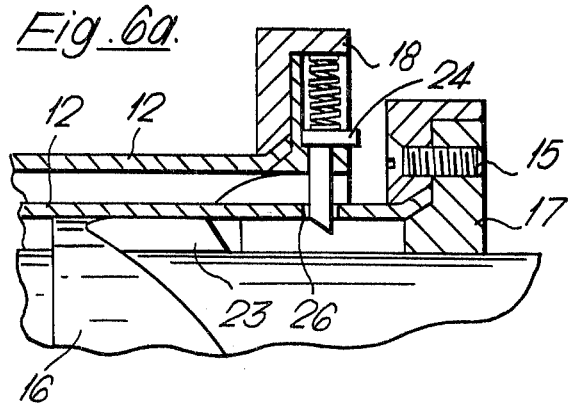
FIGS. 6a to 6d are respective diagrams illustrating the operation of the latching means of the boom.
Figure 6B:
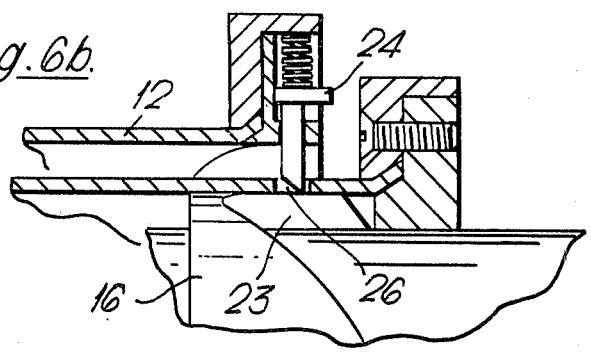
Figure 6C:
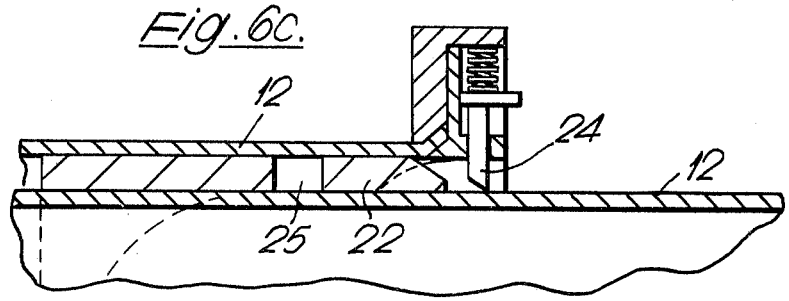
Figure 6D:
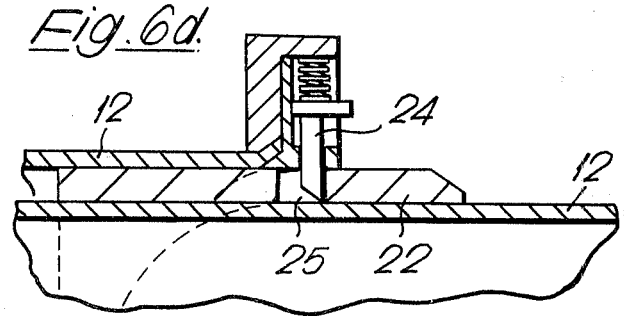

The operation of the system of latches may be seen from FIGS. 6a to 6d. FIG. 6a shows three tubular sections of which the outer two are locked together by the latch members 24 (only one of which can be seen) and of which the innermost one is approaching its fully extended position. As the innermost section reaches its extended position (FIG. 6b), the short fingers 23 of its rear end fitting 16 fit into slot 20 and lift the latch members 24 of the next-but-one tube and hence release intermediate tubular section for movement to its extended position with respect to the outer tube. Then as the intermediate tube approaches its extended position (FIGS. 6c and 6d) the longer fingers of its rear-end fitting reach the latching members 24 of the outermost tube which are first lifted and which then engage in the apertures 25 and lock the section in its extended position.

The arrangement of successive elements is such that as the latching members 24 of the next outer intermediate member enters slot 25 of a given intermediate member (i.e. the position shown in FIG. 6d) so the short fingers start lifting the latch member of the next-but-one outer member out of the slot 26 of the next outer member. Thus, when latching member is at the right hand end of slot 25 (FIG. 6d) the next outer, and next-but-one outer members are still locked together in the stowed position, but when the latch member reaches the left hand end of 25, the next outer member may move from its extended position.

In operation of a complete boom, the innermost tubular section is held in its stowed position by separate locking means (not shown) and, when the boom is to be extended, this separation locking means is released and gas is admitted to the interior of the boom. As a result, the inner tubular section moves to its extended position and then becomes locked to the next larger section while causing this section to be released so that it can move to its extended position with respect to the next larger section and so on.

As mentioned earlier, the speed at which the boom extends may be controlled by the means described in our co-pending patent application No. 8031264, i.e. by means of a cable or the like which is attached to the tip of the boom and which extends back inside it to a reeling drum of which the speed of rotation is controlled by velocity dependent retarding means such as an escapement mechanism.

Figure 8:
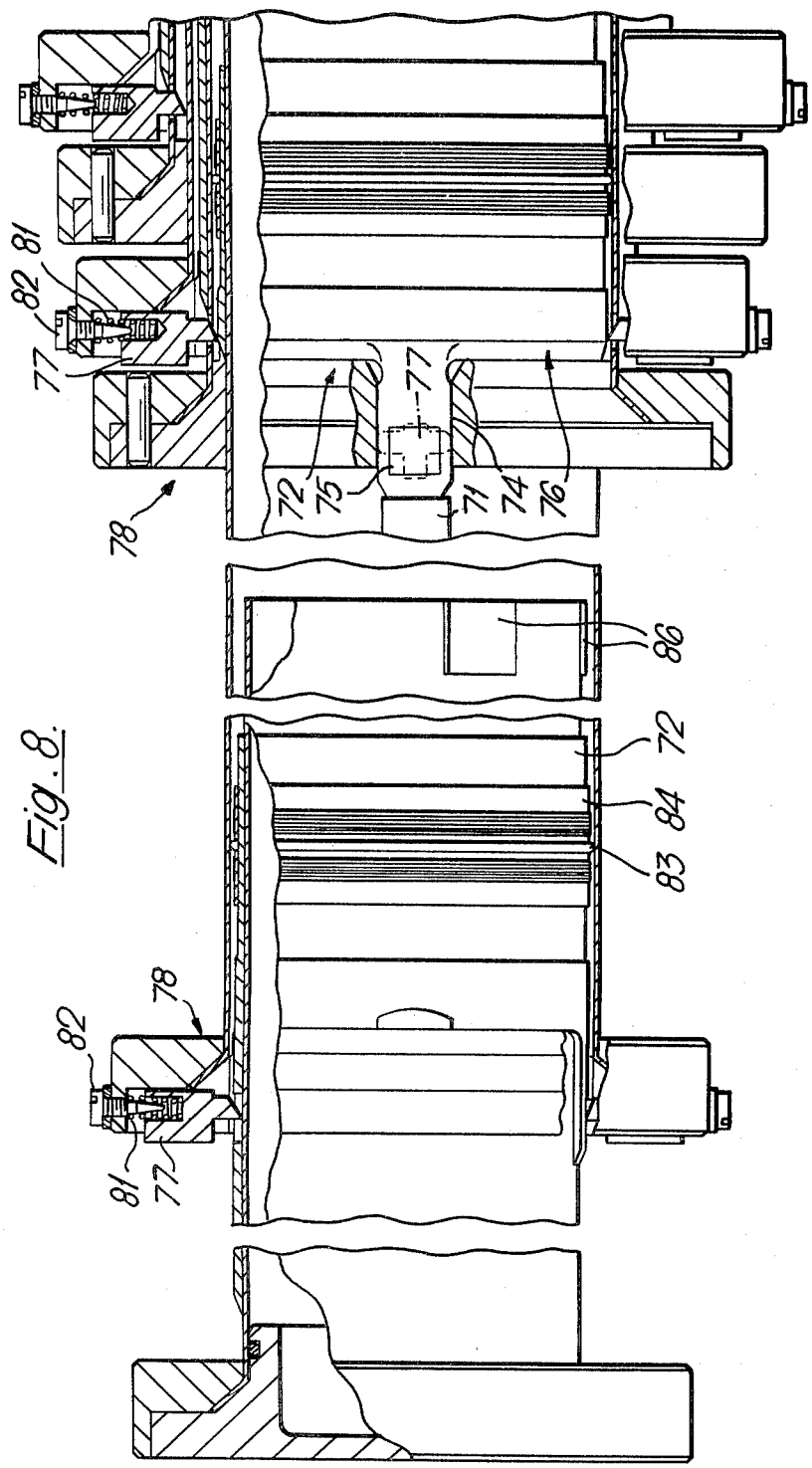
FIG. 8 is a detailed sectional elevation of the boom shown in FIG. 7.

FIGS. 7 to 9 of the accompanying drawings relate to another embodiment of the telescopic boom of this invention. In this embodiment the tubular sections of the boom are positively locked against rotation with respect to one another throughout the movement to their respective extended positions and, therefore, the forward and rear end fittings do not require the inclined surfaces 27 of the embodiment of FIGS. 2 to 5. As shown in the diagrammatic view of FIG. 7, the locking is achieved by means of a guide strip 71 which is bonded to each tube 12 so as to extend along the length of the tube. The rear end fitting 72 comprises a cylindrical member 73 having two forwardly extending latching fingers 74 each with an aperature 75 therein and each corresponding in function with one of the two longer latching fingers 22 of the embodiment of FIGS. 2 to 5. The function of the two shorter fingers 23 of FIGS. 2 to 5 is performed in the embodiment of FIGS. 7 to 9 by the cylindrical member 73 itself, of which the front end has a bevel 76 to facilitate lifting of latches 77 as the relevant section comes to its fully extended position and thereby release the next larger tubular section. Each guide strip 71 is in alignment with one of the two latching fingers 74 of the tubular section to which the strip is attached. The front end fitting 78 of each section comprises a two-part flange 10 as before but the inner part is simply formed with a smaller inner diameter than the respective tube 12 so as to present a cylindrical abutment within the tube. Two slots 79 are formed diametrically opposite one another within the flange and beneath respective ones of the two spring-loaded latches 77 which, as before, are mounted within the flange. The slots receive respective latching fingers 74 of the rear end fitting of the next smaller tubular section and, in addition, one of them receives and guides the guide strip 71 of this next smaller section.

As may be seen in the more detailed views of FIGS. 8 and 9, the spring-loaded latches 77 are biassed inwards by springs 81 which are guided and located within the housings formed in the flanges 10 by means of taper-ended screws 82. An O-ring seal 83 is held in place around each rear end fitting 72 by means of a layer of PTFE tape 84. As in the first embodiment, each tube 12 is centered within the flange of the next larger tubular section by means of bearing members 30, there being eight such members this time. In addition, each tube has bonded to it a plurality of bearing pads 85 and 86. The pads 85 are positioned intermediate the ends of the respective tubular section to support this intermediate area of the tube with respect to the next larger one while the tube is in its nested position and during the initial part of its extension. Each flange 10 is formed with slots 87 in its inner surface to enable the pads 85 on the next smaller section to emerge from behind the flange as this section moves to its extended position. The pads 86 are arranged at the rear end of each tube 12 behind the respective rear end fittings 72 to give additional support in this region. It will be appreciated that although the fittings 72 and 16 are called "rear-end fittings" they need not be right at the rear of the respective tubes 12 but are preferably displaced forwardly somewhat as shown in FIG. 7. Then, the rear bearing pads 86 prevent excessive sideways movement of the outer end of each section when it is extended, i.e., because each tube 12 when extended is still supported at two longitudinally spaced positions with respect to the next larger tube, the tubes are better maintained in axial alignment.

In the embodiments shown, each tube 12 is made of metal and has its front end flared slightly, the tubes being fixed to the respective flanges by having these flared ends clamped between the two parts of the respective flanges 10. It will be appreciated that this particular feature of construction, like other features of the illustrated embodiments, can be modified. The front end fittings can be in one piece and may be wholly or partly integral with the tubes, the tubes and fittings being made of carbon fibre reinforced plastics for example instead of metal. The rear end fittings might also be at least partly integral with the tubes.

It will be realised that no provision is made in the illustrated embodiments for disengaging the latches 24 and 77 from the rear-end fittings to enable the boom, once extended, to be restowed and so these embodiments are useful for spacecraft which, for example, are not to be brought back to earth. However, suitable disengagement means could be provided so as to form a retractable version of the boom, for example there could be provided respective mechanisms which act automatically during retraction to, in turn, push out of engagement the latches holding each section so that the boom can be retracted section by section in sequence just as it was extended.

In order to prevent 'slap' or backlash of an extended boom structure, the pads 86 may be dimensioned so as to effect slight local deformation of the tubes. In addition, one latch and aperture of each pair of associated latchs 77 and apertures 75 may be designed to be of a close fit whilst the other is of a relatively free fit. As well as reducing slap, these features also allow the coupling between two adjacent tubes to have a predetermined stiffness. This allows the bending and torsional characteristics of an extended boom more readily to be predicted.

We claim:

1. A multi-member telescopic boom arrangement of members nested one within another and adapted for ensuring sequential erection of the members from a stowed condition commencing with an innermost member and progressing outwardly, which arrangement includes an outermost member for anchorage to a base, an innermost member forming the remote end of the extended and extending boom, one or more intermediate members lying, when stowed, between the innermost and outermost members, latch members provided on a forward region of the outermost member and the or each intermediate member and biased inwardly, recess means provided on rearward regions of the innermost member and the or each intermediate member, into which the latch means on the respective next outer member may latch to lock the respective innermost or intermediate member in an extended position, aperture means provided on forward regions of the or each intermediate member and through which the latch means on the respective next outer member may protrude to lock the respective intermediate member in a stowed position, camming surface means provided on the rearward regions of the next but one outermost member and each member inner thereto, said camming surface means being adapted to disengage the protruding latch means on the next but one outer member from the aperture means of the next outer member when the member to which it is attached moves to an extended position, the arrangement being such that in the stowed condition the latch means on each member protrudes through the aperture means of the respective next inner member to lock it in its stowed position, but that on displacement of an inner member to an extended position, the camming surface means provided thereon disengages the latch means of the next but one outer member from the aperture of the next outer member to release the next outer member for movement, and the latch means of the next outer member latches in the recess means of the inner member to lock the inner member and the next outer member together.

2. A boom arrangement as claimed in claim 1, wherein means are provided to prevent rotation between adjacent members.

3. A boom arrangement as claimed in claim 1, wherein the inner member of each two adjacent members includes bearing means adapted to bear on the inside surface of the outer member of the two.

4. A boom arrangement according to claim 1, wherein the outer member of each two adjacent members includes bearing means adapted to bear on the outside surface of the inner member of the two.

5. A boom arrangement according to claim 1, wherein the recess means and the latch means (where provided) on each intermediate member are spaced by approximately 90° about the longitudinal axis of the member.

6. An element for use as an intermediate member in a boom arrangement as recited in claim 1, which element comprises a generally cylindrical tubular member having a rearward end portion and a forward end portion, camming surface means provided on the exterior of the rearward end portion, recess means provided forwardly of the camming surface means, aperture means provided in the forward end portion, in axial alignment with said recess means, and latch means provided on the forward end portion and biased inwardly.

7. An element according to claim 6, wherein the recess means comprises a pair of diametrically opposed recesses provided on said tubular member, and the aperture means comprises a pair of diametrically opposed apertures provided in said tubular member, and the latch means comprises a pair of diametrically opposed latches provided on said tubular element but oriented at substantially 90° to said recesses and apertures.

* * * * *